UNITED STATES PATENT OFFICE.

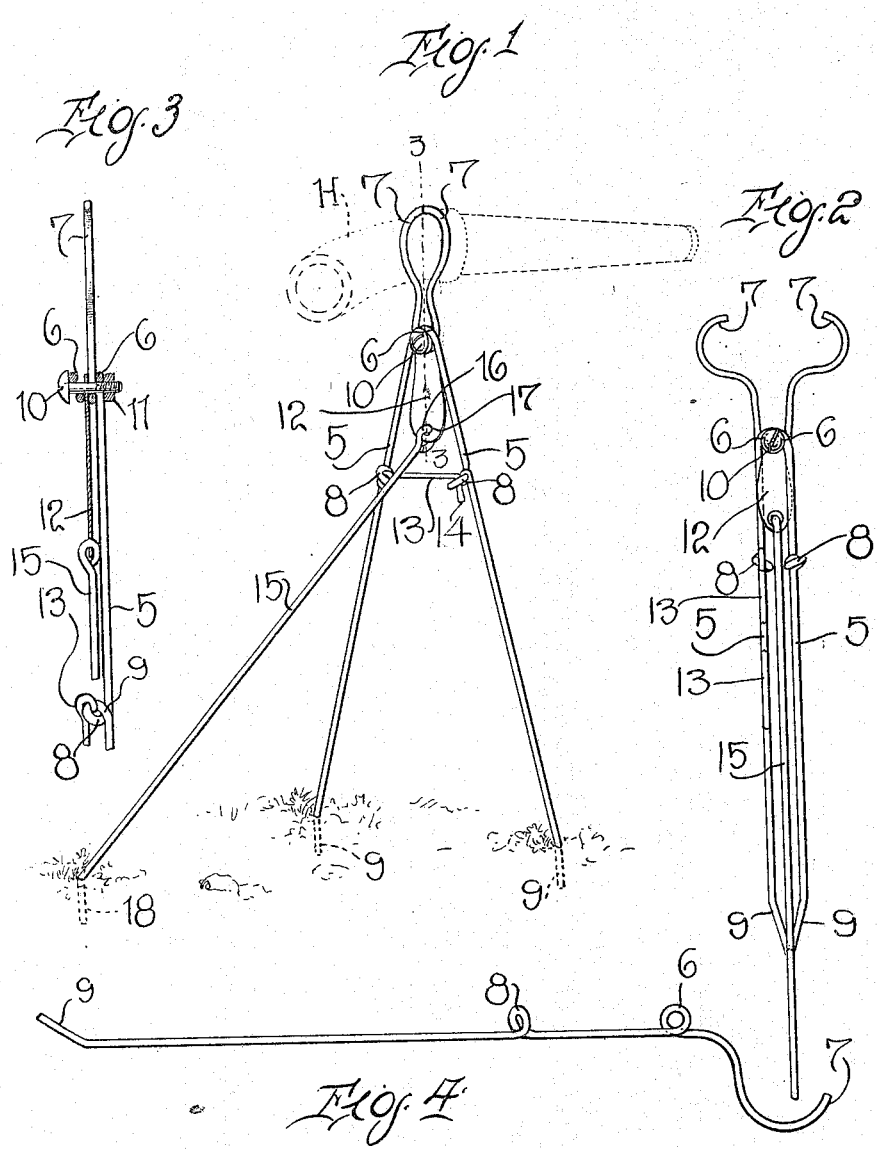

OTTO LENK, OF LIVINGSTON, MONTANA.

HOSE-SUPPORTER.

1,129,210.

Specification of Letters Patent. Patented Feb. 23, 1915.

Application filed August 22, 1914. Serial No. 858,046.

*To all whom it may concern:*

Be it known that I, OTTO LENK, a citizen of the United States, residing at Livingston, in the county of Park and State of Montana, have invented certain new and useful Improvements in Hose-Supporters, of which the following is a specification, reference being had to the accompanying drawings.

This invention relates to an improved hose supporting device and has for its primary object to provide a simple, durable and serviceable device of this character for supporting garden hose, so that the nozzle may be held in spaced relation to the ground.

The invention has for a more particular object to provide a device of the above character embodying two pivotally connected supporting legs, each provided upon its upper end with a hose engaging clamp, means for securing the supporting legs in separated relation, and an additional supporting member loosely suspended from the pivot of the pair of adjustable supports.

The invention has for a further object to generally improve and simplify the construction of devices of the above character, whereby the same may be produced at small manufacturing cost and rendered highly serviceable in practical use.

With the above and other objects in view, the invention consists in novel features of construction, combination and arrangement of parts as will be hereinafter referred to and more particularly pointed out in the specification and claims.

For a full understanding of the invention, reference is to be had to the following description and accompanying drawing, in which:

Figure 1 is a perspective view of my improved hose supporting device, Fig. 2 is an elevation showing the device collapsed or folded, Fig. 3 is a section taken on the line 3—3 of Fig. 1, and Fig. 4 is an elevation of one of the supporting rods.

Referring in detail to the drawing 5 designates two similarly formed supporting rods or legs. Each of these rods adjacent to one of its ends is provided with an eye 6, and from said eye the end of the rod is extended in the form of a half loop or hook as shown at 7. Intermediate of its ends the rod is bent to form a second eye 8 therein. This latter eye extends at right angles to the rod. The other end of each of the rods 5 is preferably bent and disposed at an angle to the axis of the rod as at 9, whereby anchoring lugs or extensions are formed which are adapted to be embedded in the ground when the device is set up in position for use.

A bolt 10 is disposed through the eyes 6 on the rods 5 whereby said rods are connected for pivotal movement with respect to each other. A suitable nut 11 is threaded upon one end of said bolt to retain the same in the eyes. A depending plate 12 is also engaged at one of its ends upon said bolt and disposed between the eyes 6. The particular purpose of this plate will be hereinafter explained. To the eye 8 on one of the rods 5 one end of a latch rod 13 is loosely connected, the other end of said rod being provided with a hook 14, which is adapted for engagement in the eye 8 in the other of the supporting rods 5.

In the use of the device it will be understood from reference to Fig. 1 of the drawing, that the rods 5 are separated from each other so that the hooks 7 upon their upper ends will move inwardly and clamp upon opposite sides of the hose indicated at H. The rods 5 are now connected by means of the rod 13, the hook 14 thereof being engaged in the eye 8 on one of the rods. Thus the supporting rods 5 are held against relative movement. The lower ends 9 of the rods 5 are then forced into the ground. An additional supporting rod 15 is provided with an eye 16 on one end which is loosely engaged in an opening 17 formed in the lower end of the plate 12. The other end of this rod 15 is angularly bent as shown at 18, and also adapted to be securely embedded in the ground. This additional supporting rod extends at an acute angle with respect to the rods 5. Thus it will be manifest that by means of the rods 5 which securely clamp the hose at their upper ends and the rod 15 said hose is properly supported in spaced relation to the ground, so that a lawn may be sprayed and casual displacement of the hose nozzle prevented. When it is no longer desired to use the support, the rods 5 may be readily folded upon each other by removing the latch hook 14 and said rods together with the rod 15 compactly arranged. It will of course, be understood that the rods may be of any desired length or diameter as the particular use of the device may render desirable or necessary.

From the foregoing description taken in connection with the accompanying drawing the construction, manner of use and several advantages of my invention will be clearly and fully understood. It will be seen that I have produced a very simple and serviceable hose support which may be easily and quickly arranged in operative position to support a hose.

The device comprises but very few elements in its construction which are all of extremely simple form thereby conducing to a low cost of manufacture. The support is also very durable in practical use and highly serviceable for the purpose in view.

While I have shown and described the preferred form, construction and arrangement of the several elements employed, it is manifest that the same are susceptible to considerable modification and I therefore reserve the privilege of resorting to all such legitimate changes as may be fairly embodied within the spirit and scope of the invention as claimed.

What I claim is:

1. A support of the character above described comprising a pair of supporting rods pivotally connected adjacent one of their ends, said end of the rods being extended from the pivot and provided with hose clamping hooks for engagement with a hose, means for holding said rods in operative position against relative pivotal movement, and an additional supporting rod loosely suspended from the pivot of said first named rods.

2. A supporting device of the character described comprising a pair of supporting rods, each provided with an eye adjacent to one end, the end of the rod being extended from said eye and formed into a clamping hook, each of said rods being also provided with an additional eye spaced from said first named eye and projecting at right angles from the rod, a latch hook connected to one of said latter eyes and adapted for engagement in the corresponding eye on the other rod, a pivot bolt disposed through the first named eyes and connecting said rods, a plate depending from said bolt and arranged between the eyes on said rods, and an additional supporting rod loosely connected to said plate.

In testimony whereof I hereunto affix my signature in the presence of two witnesses.

OTTO LENK.

Witnesses:
H. WM. SCHMIDLAPP,
A. N. VEIT.

Copies of this patent may be obtained for five cents each, by addressing the "Commissioner of Patents, Washington, D. C."